Figure 1:
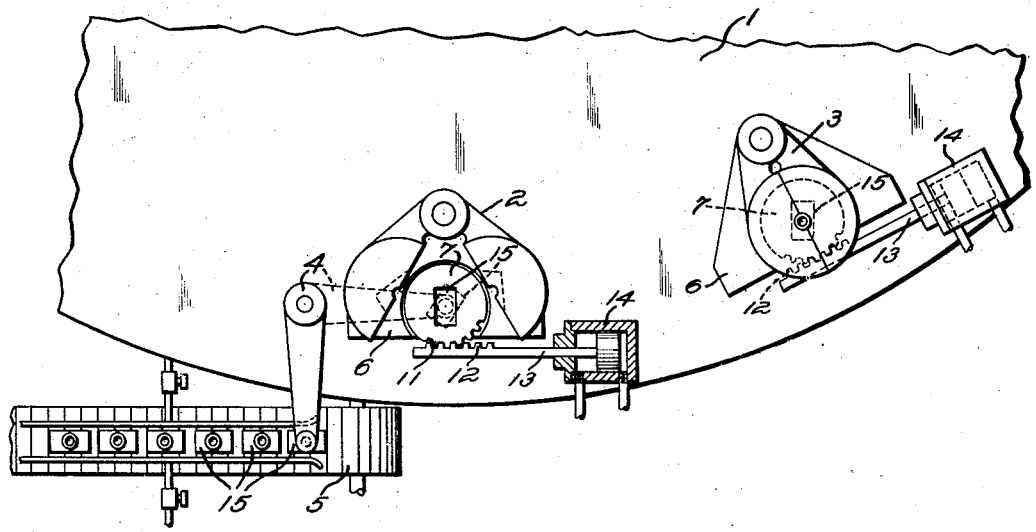

April 8, 1930.  E. O. HILLER  1,753,655

GLASS FABRICATING MECHANISM

Filed Jan. 3, 1928

Inventor:
Everett O. Hiller
by Robert D. Brown
Attorney.

Patented Apr. 8, 1930

1,753,655

UNITED STATES PATENT OFFICE

EVERETT O. HILLER, OF HARTFORD, CONNECTICUT, ASSIGNOR TO HARTFORD-EMPIRE COMPANY, OF HARTFORD, CONNECTICUT, A CORPORATION OF DELAWARE

GLASS-FABRICATING MECHANISM

Application filed January 3, 1928. Serial No. 244,066.

My invention relates to the manufacture of square or panel bottles and other glass articles that are not round in contour, and its object is to make possible the delivery of such articles to the conveyor with their long axes in any desired position relative to the center line of said conveyor.

In ordinary bottle making machinery, square and panel bottles are made in split molds with the mold cavities in a diagonal position relative to the plane of split of the mold. When it is desired to take out such articles and deliver them to a buck or other conveyor traveling parallel or perpendicular to the plane on which the mold-halves close, it is desirable at times to give each bottle a partial rotation, so that the bottles will be lined up properly on the conveyor.

An object of the present invention is to provide a means for positioning non-circular glass articles while they are still associated with the molds in which they are formed; so that when they are removed from the molds and conveyed to an annealing lehr, they may be stacked therein with the maximum economy of space upon the lehr conveyor, and preferably also upon any conveyor which may be used in transporting them from the forming machine to the lehr. It often happens that such transferring conveyors, or "bucks" as they are called, are required to be placed at a certain arbitrary angle with respect to the forming machine and that the take-out mechanism normally employed with such machine is not itself adapted to be moved so as to place non-circular articles upon the buck at a desired angle and therefore efficient mechanical or automatic handling of non-circular articles is rendered difficult, if not impossible.

I accomplish this object according to my present invention by turning the bottle on its vertical axis while it is still in the mold and after the mold is opened, preferably by rotating the bottom plate of the mold.

The specific means illustrated in the drawings comprise a mold-bottom arranged to be rotated and means, actuated when the mold is open, first for rotating the mold bottom in one direction to bring the ware to the desired position and then, after the ware has been removed, for rotating the mold bottom in the opposite direction, so that the mold parts may properly close about the bottom.

Figure 2:
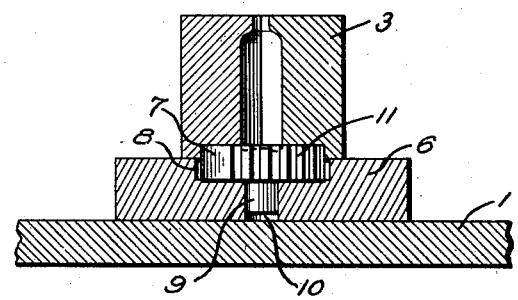

In the accompanying drawing,

Figure 1 is a broken plan view showing a rotary mold table, partible molds mounted thereon to which my invention is applied, take-out mechanism and a buck or conveyor, and Fig. 2 is a vertical section through a closed mold.

In the drawings to simplify the description I have omitted the neck rings of the molds and have not shown the necks of the ware.

Referring to the drawings, 1 represents a rotary mold table assumed to have a clockwise movement. 2 represents one of the partible molds shown open and in the take-out position, and 3 represents a second mold shown closed and next to assume the take-out position.

4 represents the take-out mechanism shown in dotted lines positioned over the open mold 2 to grasp the ware and shown in full lines in its position to deposit the ware on the buck 5 which conveys the ware to the lehr, not shown.

6 represents mold plates which are mounted on the table 1 and on which the molds are mounted and upon which the mold parts move in opening and closing the partible mold.

7 represents one of the removable bottom plates provided with a suitable configuration of its upper surface for forming the bottom of the ware. The mold parts close about the bottom 7. The mold bottom 7 is seated in the recess 8 of the plate 6 and is rotatable therein. Thus the bottom 7 may be axially provided with a depending cylindrical stem 9 which is journaled in the socket 10 in the mold plate.

The perimetral edge of the bottom 7 which extends forwardly past the front edge of the plate 6 is provided with a series of teeth 11 which are in mesh with a rack 12 on the piston rod 13 of a fluid pressure cylinder and piston mechanism 14 which is mounted on the table 1 and which is arranged to move the piston rod 13 outwardly and inwardly relative to the cylinder.

The ware, illustrated as panel bottles 15, is fabricated in the molds in the relative position shown in dotted lines in the case of the closed mold 3 and the open mold 2, and is to be turned in the open molds into the relative position shown in full lines in connection with the open mold 2 before being grasped by the take-out mechanism 4, so that the latter will, in depositing the ware on the buck 5, properly line up the ware on the buck in substantially the manner shown.

To accomplish this purpose, when the mold opens, the rack 12 is moved toward the right in Fig. 1, thus rotating the mold bottom 7 in a counterclockwise direction, so that the bottle 15 standing on the bottom is turned into proper delivery position. After the bottle is lifted from the mold bottom, the rack is moved in the reverse direction to restore the mold bottom to its proper position for fabrication before the mold parts again close.

It is evident that by the use of my invention the proper line-up of the ware on the buck and consequently on the conveyor of the lehr is assured.

Moreover, this purpose is accomplished without complicating the take-out mechanism by provision of means for turning the bottle or other ware relative to the take-out mechanism while being removed from the open mold.

What I desire to claim is:—

1. The combination with a partible mold for glassware, take-out mechanism and a receiver upon which said take-out mechanism deposits the ware, of means for properly positioning the ware with respect to the mold after it has been opened and before the ware is grasped by the take-out mechanism.

2. The combination with a partible mold for glassware, take-out mechanism and a receiver upon which said take-out mechanism deposits the ware, of means for turning the mold-bottom with the ware remaining thereon after the mold has been opened and before the ware is grasped by the take-out mechanism for the purpose described.

3. In a glass fabricating mechanism, the combination of a partible mold, take-out mechanism, a receiver upon which said take-out mechanism deposits the ware, a mold bottom mounted for rotation with respect to the mold, and means for rotating said bottom through a predetermined angle when the mold is opened for the purpose described.

4. In glass fabricating mechanism, the combination of a partible mold, take-out mechanism arranged to remove the ware from the open mold, a receiver upon which said take-out mechanism deposits the ware, a mold-bottom mounted to rotate, and means for rotating said mold-bottom previous to the take-out operation to turn the ware on its vertical axis.

5. The combination with a rotatable carrier, a mold for glassware mounted on said carrier, take-out mechanism, and a receiver upon which said take-out mechanism deposits the ware, of means independent of the rotation of said carrier for turning the ware on its vertical axis before it is removed from the mold.

Signed at Hartford, Conn., this 19th day of December, 1927.

EVERETT O. HILLER.